Nov. 1, 1960    F. K. MUELLER    2,958,137
LEVEL INDICATING DEVICE

Filed April 15, 1958    3 Sheets-Sheet 1

INVENTOR:
FRITZ K. MUELLER
BY W. E. Thibodeau,
Victor L. Billings and
Alvin E. Moore Nov. 1, 1960  F. K. MUELLER  2,958,137
LEVEL INDICATING DEVICE
Filed April 15, 1958  3 Sheets-Sheet 2

INVENTOR:
FRITZ K. MUELLER
BY W. E. Thibodeau,
Victor L. Billings and
Alvin E. Moore, Nov. 1, 1960         F. K. MUELLER         2,958,137
              LEVEL INDICATING DEVICE
Filed April 15, 1958                    3 Sheets-Sheet 3

INVENTOR:
FRITZ K. MUELLER
BY W. E. Thibodeau,
Victor L. Billings and
Alvin E. Moore, United States Patent Office 2,958,137
Patented Nov. 1, 1960

2,958,137
LEVEL INDICATING DEVICE

Fritz K. Mueller, Huntsville, Ala., assignor to the United States of America as represented by the Secretary of the Army Filed Apr. 15, 1958, Ser. No. 728,755
6 Claims. (Cl. 33—206)
(Granted under Title 35, U.S. Code (1952), sec. 266)

The invention described herein may be manufactured and used by or for the Government for governmental purposes without the payment of any royalty thereon.

This invention relates to a level indicating device. Such devices may be used to indicate departures from the level, plumbline or other attitude of various movable objects. An example of such an object is a stabilized platform on an aircraft, guided missile, ship or land vehicle, which platform constitutes a level support for a compass, a pitch detector, a roll detector, a camera, or other instrument.

Conventional level sensing devices comprise a pivoted element mounted in bearings that impose a couple, due to friction, on the axis of the element. This friction reduces sensitivity of the movable element, prevents a clearly defined middle or zero position of the element, and thus considerably reduces the accuracy of any conventional leveling or plumbing device.

An object of the invention is to provide a device that indicates changes of level, plumbline or acceleration, comprising a force-sensitive, reciprocable element that is highly sensitive to changes of force on it but that, after its initial quick movement, is rapidly damped.

Another object of the invention is to provide such a device with an adjustable damping means at each end.

Another object of the invention is to provide such a device that has a sharply defined, adjustable zero position.

A further object of the invention is to provide an air bearing for a level-indicating device comprising a casing having concave bearing surfaces therein, a reciprocable element wholly housed in said casing and having convex surfaces fitting within said concave surfaces, means for supplying compressed air or other gas to said concave surfaces, for supporting said reciprocable element on compressed gas, and chambers at the ends of the element for damping it by means of compressed gas.

Still another object of the invention is to provide an efficient air bearing for reciprocable elements.

The foregoing and other objects of this invention will become more fully apparent from the following detailed description of an exemplary embodiment thereof and from the accompanying drawings, in which.

Figure 1:
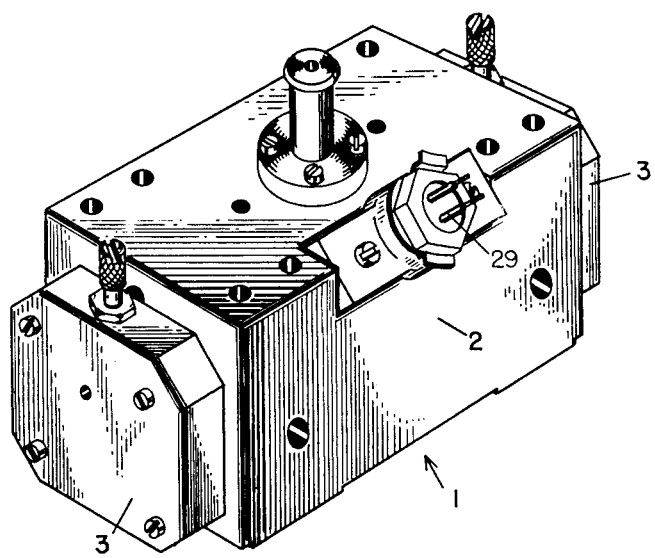
Figure 1 is a perspective view of a level-sensing apparatus incorporating my invention.
Figure 2:
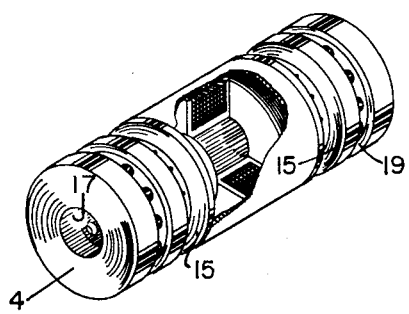
Figure 2 is a perspective view of the core of the device, insertable within the casing shown in Figure 1.
Figure 3:
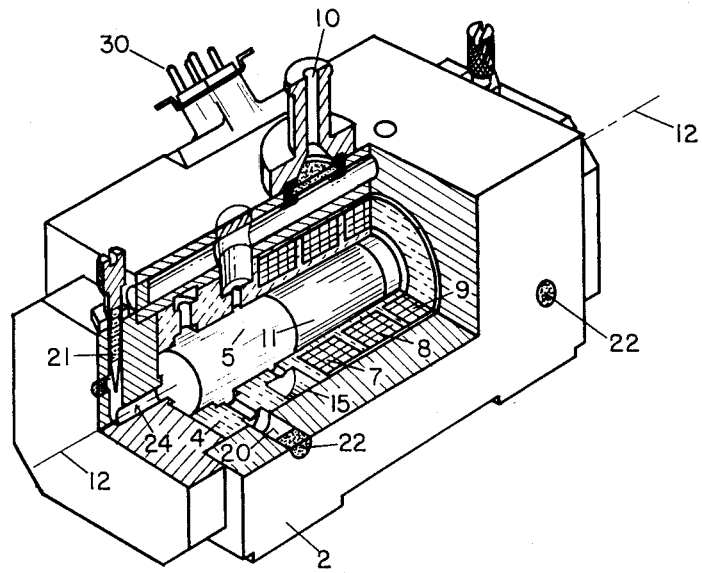
Figure 3 is a perspective view of the device, partly cut away to indicate its internal parts.
Figure 4:
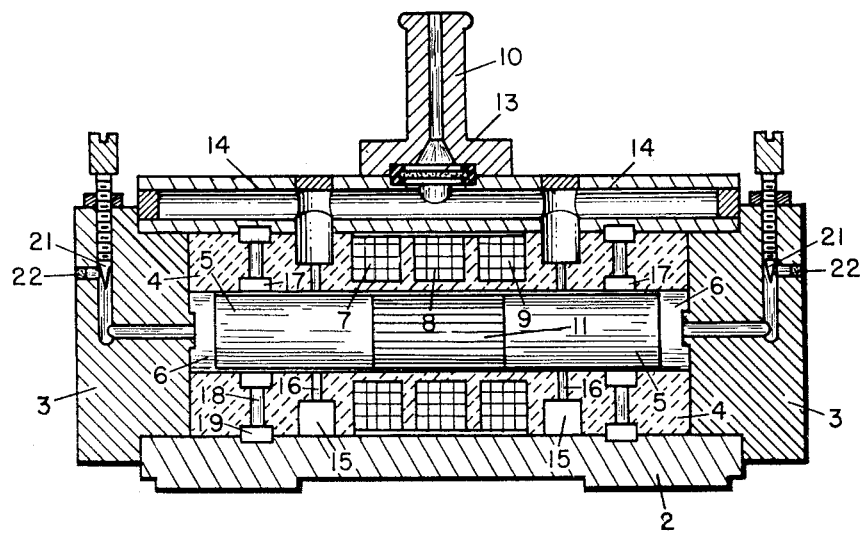
Figure 4 is an elevational view in section taken axially of the device.

As shown in the drawings, the level and plumbline indicating device comprises: a casing 1, consisting of an apertured, symmetrical frame 2 and end caps 3 fitted into the ends of the aperture; an apertured core sleeve 4; a differential transformer having coils 7, 8 and 9; a reciprocable element or piston 5, mounted, with a clearance, in said core sleeve 4; and means 10 for the supply of compressed air to the air bearing between elements 4 and 5. At each end of the reciprocable element there is a large clearance, or chamber, 6, which during operation becomes filled with air and serves for damping the movement of piston 5, and, when the device is used in an automatic control system, eliminates hunting of the controls.

Core sleeve 4 is made of an electrically insulating material, and is preferably of vitreous ceramic or like material. One material that may be used is composed of magnesium oxide and silicon dioxide; another is composed of zirconium dioxide and silicon dioxide. At its middle portion sleeve 4 is externally and annularly recessed for housing the three coils 7, 8 and 9 of the differential transformer.

Piston or cylinder 5 is made of ceramic or other electrically insulating material, preferably of one of the specific compositions set forth above. This piston, which is the equivalent of a pendulum, has a middle portion 11 of magnetic material, such as iron. The magnetic core coacts with the transformer coils to produce an electrical signal that is transmitted via connections 30 when the piston shifts from its median position, and to produce no signal, or a signal of zero value, when the piston axis or datum line 12 is in a horizontal plane.

In order to make the cylinder or quasi pendulum 5 highly sensitive to changes in the level of the device a novel air bearing is provided. Compressed air or, alternatively, other gas from a reservoir or compressor is supplied to the level-indicating device fom fitting 10, preferably through a filter 13, to passages 14, 15 and 16, to form an air bearing between sleeve 4 and piston 5. From this air bearing, that is, from each end portion of piston 5, the air is conducted through passages 18, 19 and 20 either to the atmosphere (optionally through a filter, 22) or via conduits to the inlet of a compressor. Passages 15 are annular air-supplying recesses; passages 19 are annular recesses which are sealingly joined to frame 2, thus forming surge-preventing chambers. Annular passages 17 also constitute surge-preventing chambers. They are axially spaced from the end of sleeve 4 by an amount equal to or slightly greater than the sum of the axial dimensions of the two air chambers 6, so that in any position of the cylinder 5 there are restrictions in the air-flow paths between passages 17 and both of the end chambers 6.

Air flow from the chambers 6 to the atmosphere (or the compressor inlet) is controlled by means of the adjustable valves 21. In use, these valves may be adjusted to provide a restricted flow of air from chambers 6; or one or both of said valves may be closed completely to shut off the flow of air via one or both of passages 22. Alternatively, the valves and the end-plate passages controlled by the valves may be eliminated.

Figure 5:
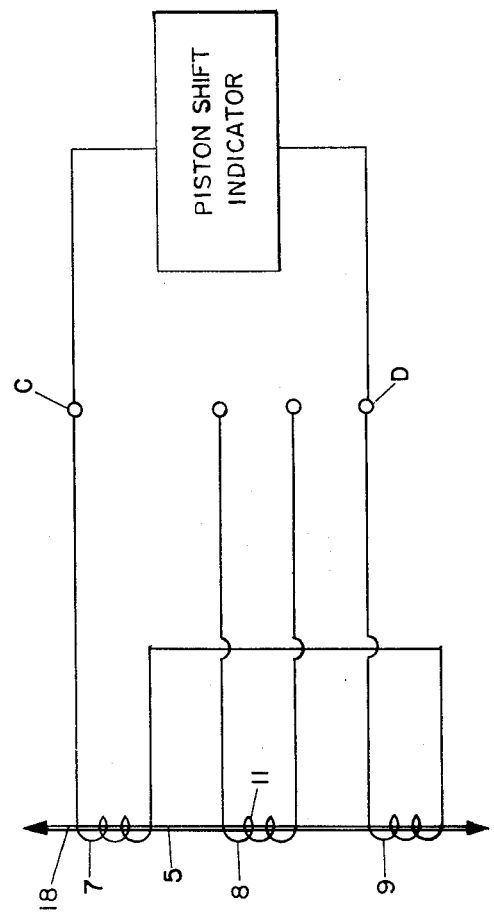
Figure 5 is a diagram indicating the differential transformer and its electrical connections.

With reference to the schematic showing of the differential transformer in Figure 5, a constant input voltage, which may be adjusted, is applied to the middle coil 8 of the transformer. When the magnetic middle portion of the piston or cylinder 5, schematically shown in Figure 5, is centered within the transformer coils equal voltages are induced in the end coils 7 and 9. Since these coils are connected in series opposition, the net output voltage is zero when the datum line of the device is level. But when cylinder 5 shifts from its median position its magnetic portion causes a change in the flux distribution in the transformer, so that unequal voltages are induced in the two end coils, resulting in an output or signal voltage that is proportional to the movement of the cylinder. This signal voltage is conducted from terminal C and/or terminal D to a level or plumbline indicating device of any known type, indicating and/or measuring any shift of piston 5. This device preferably is phase sensitive and comprises a conventional phase meter. In lieu of supplying the signals of a piston shift to an indicator which may be observed by an operator, the signals may be sent to a conventional computer in an automatic control system for restoration of the device 1 and its support to a level position.

The movement of cylinder 5 is resisted by two forces that increase as the cylinder moves farther from its median position. One of these increasing forces is the reaction force that is exerted on the magnetic part of the cylinder due to the increasingly unequal flux distribution as the cylinder moves from its center position. This reaction force determines the maximum linear range of the cylinder, which range may be varied by adjusting the current in the middle transformer coil 8.

The other of the two forces that increasingly resist and damp movement of cylinder 5 is provided within the end chambers 6. As the cylinder moves toward one of the end caps 3 the air pressure within the decreasing one of the chambers 6 is temporarily increased. The amount of this increase in pressure depends on the degree of obstruction to the flow of air from 22 that is provided by adjustable valve 21, and also depends on the speed of movement of cylinder 5.

In calibrating the level and plumbline indicating device, it is placed on a level platform, or, alternatively, on a platform placed at any desired angle to the horizontal, with the datum line of the device level, and any output or signal current that may be coming from the differential transformer is then tuned out by longitudinal adjustment of one of the end coils, or by appropriate honing and consequent minor adjustment of the lower surfaces of the frame 2.

The gas used in the gaseous bearing is preferably air, of a low pressure and a controlled temperature.

In operation, the calibrated device is placed on a stabilized platform, or on a stabilized antenna, contour-plowing tractor, camera boom, or the like, and compressed air or other gas is supplied through fitting 10. When the platform or other support departs from a level position of its datum line (which may be axis 12 or any selected line of the device that is parallel to 12) the highly sensitive cylinder 5, supported on the air bearing, quickly shifts to the temporarily lower end of sleeve 4. But due to the restriction formed by the lower valve 21 the air in the lower chamber 6 cannot quickly escape therefrom, and consequently, a damping of the cylinder's movement occurs. Simultaneously, due to the restriction of the temporarily upper valve 21, a partial vacuum forms in the temporarily upper chamber 6, which also aids in damping the movement of piston 5. On such shifting of the cylinder and its magnetic middle portion the appropriate one of the end coils 7 and 9 supplies a signal current, for operation of a voltmeter, pointer or the like.

The invention comprehends various obvious changes in the specific embodiment herein illustrated, within the scope of the appended claims. For instance, it is obvious that for the electrical connections, differential transformer coils and magnetic core 11 there may be substituted equivalent hydraulic connections, valve sleeve and piston valve passages.

The following invention is claimed:

1. A position-indicating device comprising: a housing having a hollow space, closure walls at the ends of said space, and a gas passage from the exterior of said housing to said hollow space; a sleeve of dielectric material supported by said housing, within said hollow space and abutting against said closure walls, said sleeve comprising an elongated middle portion and two elongated end portions; the radially outer part of said middle portion being provided with three laterally-spaced, peripheral, coil-containing recesses, with each pair of said recesses being separated by a thickness of dielectric material; each of said elongated end portions having a peripheral, air-supplying recess opening into said hollow-space, passages leading from said air-supplying recesses to the bore of the sleeve, and a pair of annular, surge-counteracting recesses, each recess of said pair being laterally spaced toward one of said closure walls from said passages leading to the bore; each of said end portions being separated from one of said closure walls by an imperforate surface of dielectric material; three differential transformer coils in said coil-containing recesses; means connected to the middle one of said transformer coils for supplying electric current to said middle coil; means connected to the other two of said transformer coils for transmitting signal voltages from said other two coils; an imperforate, cylindrical force-sensitive element having an axis coinciding with that of said bore and a length that is greater than the distance between said surge-counteracting recesses and less than the length of said bore, the peripheral surface of said element having a diameter at all points that is slightly less than the diameter of said bore, said element being reciprocable in the bore of said sleeve, having a middle part of magnetic material, normally centered within said middle sleeve portion, and having a cylindrical surface joined to two imperforate flat end surfaces, said magnetic part, in movement from its central position, varying the voltage induced in the two end coils of the group of transformer coils, thus varying said signal voltages, and thus setting up an increasing electromagnetic force that damps said movement, whereby the clearance between each of said end surfaces and said bore provides a damping chamber between each end of said element and the adjacent one of said closure walls; each of said closure walls having an opening to the exterior of said housing; a variable flow-restriction means in each of said openings, adjustable from the exterior of said housing; and a gas conduit connected to said housing gas passage, whereby compressed gas may be supplied thru said housing gas passage and air-supplying recesses and sleeve passages to said bore, for supporting said element on a film of gas, and thru said surge-counteracting recesses and damping chambers, for additional damping of the movement of said element.

2. A device as set forth in claim 1, in which said force-sensitive element is a gravity-sensitive member.

3. A device as set forth in claim 1, which further comprises a filter in said gas conduit.

4. A device as set forth in claim 1, which further comprises an electrically-actuated, force-indicating means, electrically connected in a circuit with said signal-transmitting transformer coils.

5. A device as set forth in claim 1, in which said sleeve and the non-magnetic part of said force-sensitive element are of vitreous ceramic material.

6. A device as set forth in claim 1, in which said sleeve has passages leading radially outward from each of said surge-counteracting recesses, and in which said sleeve and frame have between them a pair of annular surge-preventing chambers, each of said last-named chambers being in communication with a set of said passages from one of said surge-counteracting recesses.

References Cited in the file of this patent

UNITED STATES PATENTS

| 2,040,254 | Fitzgerald | May 12, 1936 |
| 2,067,474 | Carbonara | Jan. 12, 1937 |
| 2,365,727 | Pike | Dec. 26, 1944 |
| 2,570,672 | Hathaway | Oct. 9, 1951 |
| 2,591,921 | Cosgriff et al. | Apr. 8, 1952 |
| 2,660,484 | Gerard et al. | Nov. 24, 1953 |